H. D. FLEGEL.
GAGE.
APPLICATION FILED APR. 25, 1912.
1,046,761.
Patented Dec. 10, 1912.
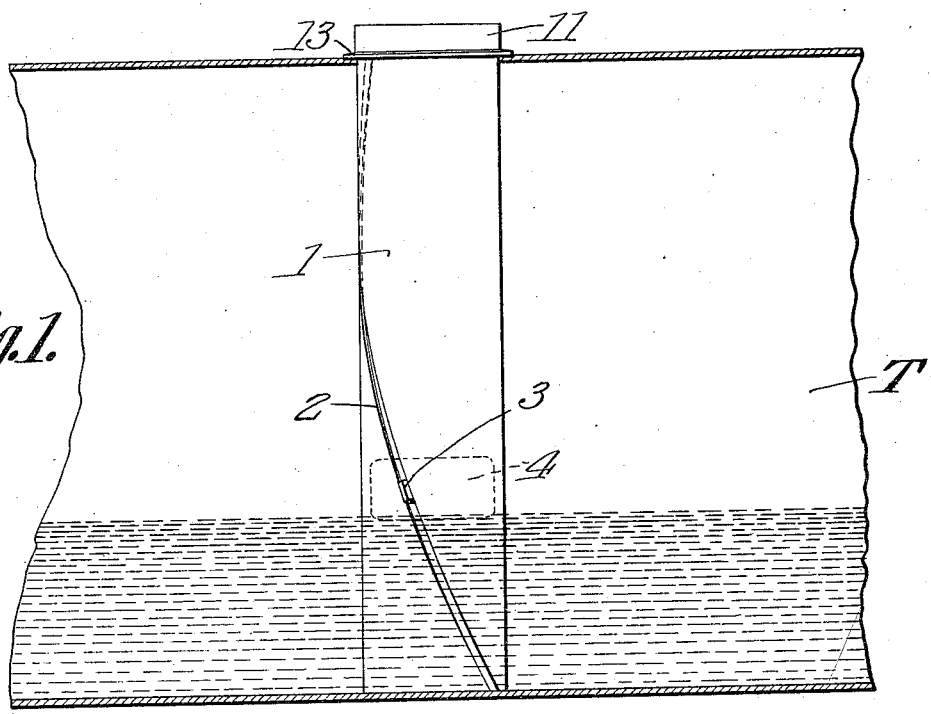
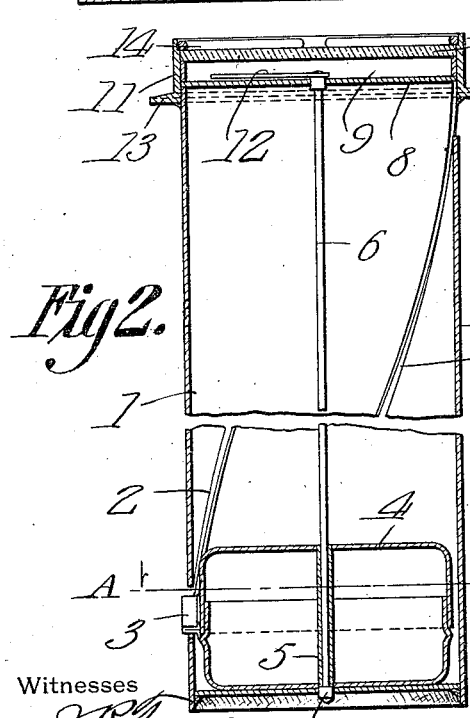
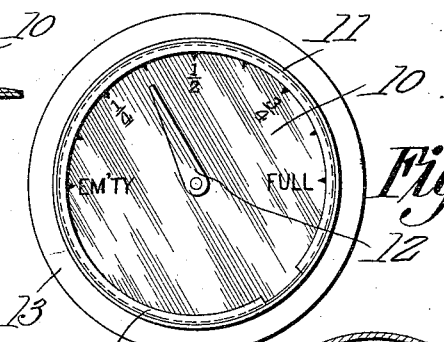
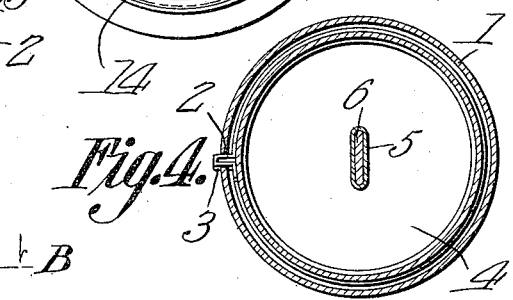
H. D. Flegel, Inventor.
Witnesses
by C. A. Snow & Co.
Attorneys

UNITED STATES PATENT OFFICE.

HARRISON D. FLEGEL, OF RACINE, WISCONSIN, ASSIGNOR, BY DIRECT AND MESNE ASSIGNMENTS, TO PERRY E. TANNER, OF AKRON, OHIO.

GAGE.

1,046,761. Specification of Letters Patent. Patented Dec. 10, 1912.

Application filed April 25, 1912. Serial No. 693,253.

*To all whom it may concern:*

Be it known that I, HARRISON D. FLEGEL, a citizen of the United States, residing at Racine, in the county of Racine and State of Wisconsin, have invented a new and useful Gage, of which the following is a specification.

This invention relates to gages particularly designed for use in connection with the gasolene tanks of automobiles, one of the objects of the invention being to provide a simple and compact device of this character which can be readily applied to an ordinary gasolene tank and which will accurately indicate the amount of liquid contained within the tank.

A further object is to provide a gage the working parts of which are easily accessible for the purpose of cleaning or repairing them.

With the foregoing and other objects in view the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a section through a portion of a fuel tank and showing the gage in position therein. Fig. 2 is an enlarged central vertical section through the gage. Fig. 3 is a plan view of the gage. Fig. 4 is a transverse section on the line A—B Fig. 2.

Referring to the figures by characters of reference T designates a portion of an ordinary gasolene tank and the gage constituting the present invention is adapted to be placed therein preferably at the center so that the level of the liquid will always be the same irrespective of the angle to which the tank may be tilted. This gage includes an outer casing 1 preferably cylindrical and having a flange 13 which rests on and is soldered or otherwise secured to the tank. In the form of the invention illustrated the casing has a spiral slot 2 extending from one end to the other thereof and partly around the casing, said slot being adapted to receive an ear 3 extending radially from a float 4 of any suitable construction. This float fits loosely within the casing 1 and has a central bearing tube 5 extending therethrough, said tube being preferably flat, as indicated particularly in Fig. 4, and being mounted to slide, with the float 4, upon a flat stem 6 extending longitudinally within the center of the casing 1. The lower end of the stem has a bearing stud 7 engaging the bottom of the casing 1 and of a diameter greater than the smallest diameter of the tube 5 so that when the stem is raised from the casing 1 it will not pull out of the float. The upper end of the stem bears within a dial plate 8 mounted on the upper end of the casing 1. A gasket 9 bears upon the peripheral portion of the dial plate 8 and supports a transparent plate 10 of glass or the like. This transparent plate is held in position on the gasket by a ring 11 which is formed on or secured to one end of the casing 1 and thus serves to hold the gasket, the transparent plate and the dial plate against lateral displacement. A groove is formed in the ring and receives an expansible spring ring 14 which holds the parts firmly together. The upper end of the stem 6 projects into the space between the plates 8 and 10 and has an index 12 secured to it. This index is adapted to point to any one of a series of suitably designated graduations formed on the dial plate as indicated particularly in Fig. 3. It will be noted that the graduation at one end of the series is designated by the word "Empty," or an abbreviation thereof while the index at the other end of the series is designated by the word "Full." When the float 4 is on the bottom of the casing 1, the index 12 will point to the graduation designated by "Empty". As the liquid rises within the tank during the filling thereof, the float will also rise therewith but, as this float has an ear projecting loosely into the spiral slot 2, it will be apparent that the float will gradually rotate as it rises, thus causing the stem 6 to rotate and to move the index 12 therewith. Said index will therefore successively point to the different graduations on the dial plate until, when the tank becomes full, the index will point to the graduation indicated by "Full". Thus it will be seen that the casing serves as a means for causing the float and the stem to rotate as the level of the liquid rises or falls. Furthermore the casing prevents the liquid from splashing against the float and subjecting it to undesirable transverse strain.

It will be seen that, by removing the ring 11, the transparent plate 10, the gasket 9 and the dial plate 8 can be lifted from the casing 1 and the stem 6 can also be removed. Likewise the float 4 can be lifted out of the casing. Thus it will be seen that all of the parts can be easily reached for the purpose of cleaning or repairing them.

It has been found that a gage such as herein described is particularly useful in connection with the gasolene tanks of motor vehicles for the reason that the liquid is prevented from dashing against the float of the gage and, as the gage is disposed centrally within the tank and extends upwardly therefrom, it accurately indicates the level of the liquid no matter at what angle the tank may be disposed relative to the horizontal. Furthermore as the ring 14 is located above the tank it can be easily reached for the purpose of removing the working parts of the gage without difficulty and without the necessity of openng the tank in which the gage is located.

What is claimed is:—

1. A tank gage including a casing, a stem mounted for rotation therein, a float slidably mounted on and revoluble with the stem, coöperating means upon the float and casing for rotating the float during its up and down movement within the casing, an index operated by the stem, and means for preventing the withdrawal of the stem from the float, said stem and float being removable together from the casing.

2. A gage for tanks including a casing, a stem mounted for rotation therein, a float slidable on and revoluble with the stem, a removable dial plate constituting a closure for the upper end of the casing, an index revoluble with the stem and above the dial plate, means on the stem for preventing its withdrawal from the float, said stem and float being removable together from the casing, coöperating means upon the float and casing for rotating the float during its movement longitudinally within the casing, and means for securing the dial plate to the casing.

3. A tank gage including a casing, a stem mounted for rotation therein and removable therefrom, a float slidably mounted on the stem, said stem having an enlarged lower end for preventing removal of the stem from the float, said stem and float being removable together from the casing, coöperating means upon the float and casing for rotating the float during its up and down movement within the casing.

4. A tank gage including a casing, a stem mounted for rotation therein and removable therefrom, a float slidably mounted on the stem, said stem having an enlarged lower end for preventing removal of the stem from the float, coöperating means upon the float and casing for rotating the float during its up and down movement within the casing, a dial plate extending around the stem, an index operated by the stem and close to the dial plate, a transparent plate within the casing, a spacing element interposed between the transparent plate and the dial plate, and means for detachably securing the transparent plate in the casing, said stem and the float and dial plate being removable together from the casing when the transparent plate is removed.

In testimony that I claim the foregoing as my own, I have hereto affixed my signature in the presence of two witnesses.

HARRISON D. FLEGEL.

Witnesses:
C. R. CARPENTER,
B. R. JONES.

---

Copies of this patent may be obtained for five cents each, by addressing the "Commissioner of Patents, Washington, D. C."